March 2, 1937.   C. A. STICKEL   2,072,187
REFRIGERATING APPARATUS
Filed Jun. 30, 1933   7 Sheets-Sheet 1

Fig. 1
Fig. 10

Inventor
Carl A. Stickel
By Spencer Hardman and Fehr
Attorneys

March 2, 1937.  C. A. STICKEL  2,072,187

REFRIGERATING APPARATUS

Filed June 30, 1933  7 Sheets-Sheet 2

Inventor
Carl A. Stickel
By Spencer Hardman and Fehr
Attorneys

Fig. 4

March 2, 1937.    C. A. STICKEL    2,072,187
REFRIGERATING APPARATUS
Filed June 30, 1933    7 Sheets-Sheet 4

Inventor
Carl A. Stickel
By Spencer Hardman and Fehr
Attorneys

March 2, 1937.  C. A. STICKEL  2,072,187
REFRIGERATING APPARATUS
Filed June 30, 1933  7 Sheets-Sheet 7

INVENTOR.
Carl A. Stickel
BY
ATTORNEYS

Patented Mar. 2, 1937

2,072,187

UNITED STATES PATENT OFFICE 2,072,187

REFRIGERATING APPARATUS

Carl A. Stickel, Dayton, Ohio, assignor, by mesne assignments, to General Motors Corporation, a corporation of Delaware Application June 30, 1933, Serial No. 678,449

12 Claims. (Cl. 62—4)

This invention relates to refrigerating apparatus and more particularly to apparatus for, and a method of, automatically defrosting the evaporator of refrigerating apparatus.

In the operation of refrigerating apparatus and particularly in the operation of refrigerating apparatus used for household purposes, it is practically essential to perform two functions: first, to lower the temperature of the refrigerator sufficiently to preserve the comestibles stored therein but not to a point low enough to freeze the comestibles, and secondly, to manufacture ice cubes. To accomplish the second of these functions, it is, of course, necessary to operate the evaporator, or at least a portion thereof, at a temperature below 32°, and to accomplish the first of these two functions it is necessary to so proportion the heat transfer surfaces of the evaporator to the amount of air flow thereover that the temperature of the air will not be reduced below the temperature required in the food storage compartment.

The operation of the evaporator at a temperature below 32° necessarily causes an accumulation of frost on the surface thereof, caused by the condensation of moisture from the circulating air and the freezing on the surface of the evaporator of the condensed moisture. The frost accumulated on the evaporator is, of course, an insulating material to a certain extent and hinders or retards the transfer of heat between the air to be cooled and the refrigerant within the evaporator. For this reason it has been necessary to provide some way of defrosting the evaporator. Heretofore this has been done manually by merely disconnecting the refrigerating apparatus from the electrical circuit, for instance, by pulling the plug out of the socket in the wall. In addition, it has been suggested to use a device in combination with the apparatus for automatically at predetermined intervals, stopping the operation of the refrigerating apparatus to permit the temperature of the evaporator to increase to a point above 32° sufficient to cause a melting of the frost.

These automatic devices, however, that have been suggested, have generally been so timed so as to operate at intervals of one week, two weeks, or at least several days and, in addition, no means has been provided for assuring that the automatic device will not become operative at a time when the refrigerating apparatus is most desired.

It is the object of my invention to provide an automatic device for causing defrosting of the evaporator at frequent intervals and at the same time to overcome the heretofore mentioned objections to prior automatic devices.

A further object of my invention is to provide in a refrigerating apparatus that is provided with means for obtaining a rather low or dessert freezing temperature, an automatic device for defrosting the evaporator, which device is so related to the refrigerating apparatus as to be automatically made incapable of operation during the time that quick freezing or a low dessert temperature is employed.

A still further object of my invention is to provide an improved automatic device for defrosting the evaporator at frequent intervals, for instance 4, 5, or 6 times a day so that the accumulation of frost at any one time will be so small that only a very short period of time will be required to defrost the evaporator, and consequently, refrigeration will be practically uninterrupted at any time.

It is another object of my invention to provide defrosting mechanism which will automatically restore the refrigerating apparatus to its normal operation after the defrosting is completed; and particularly a mechanism which may be operated as a fully automatic mechanism or a semi-automatic mechanism for defrosting.

Another object of my invention is to provide means for indicating each periodic defrosting cycle.

Further objects and advantages of the present invention will be apparent from the following description, reference being had to the accompanying drawings, wherein a preferred form of the present invention is clearly shown.

Broadly speaking, my method includes the usual steps of refrigerating process, such as evaporating the liquid refrigerant, compressing the evaporated refrigerant, condensing the compressed refrigerant and returning the liquid refrigerant to the evaporator for further evaporation. In addition, it includes the step of automatically at very frequent intervals maintaining the device inoperative for a very short period of time whereby the temperature of the evaporator is permitted to rise to a point above 32°.

Figures 1, 10:
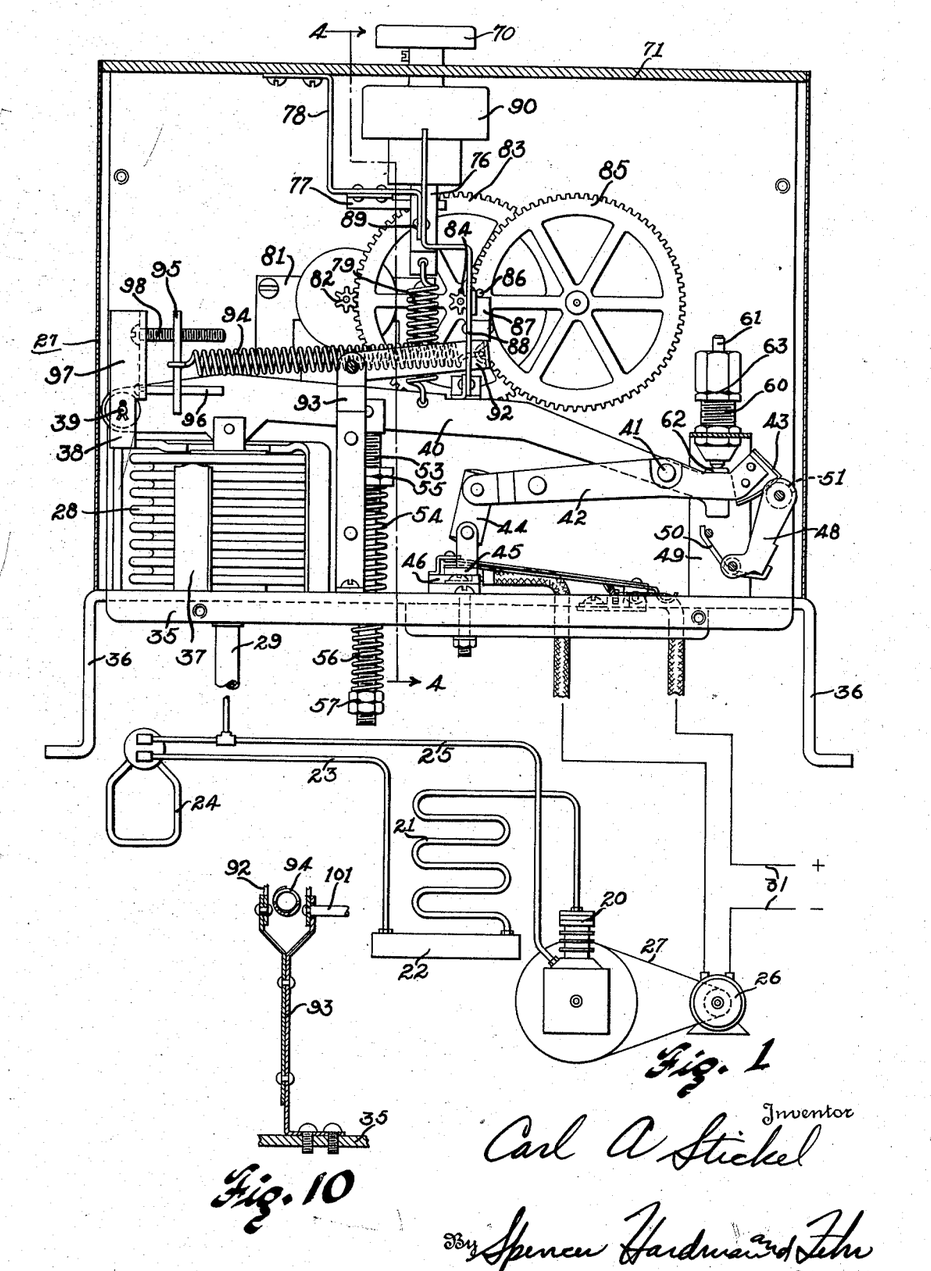
Fig. 1 is a view, partly diagrammatic, of a refrigerating system embodying one form of my invention.
Fig. 10 is a fragmentary view of the support for the toggle defrosting mechanism.
Figure 2:
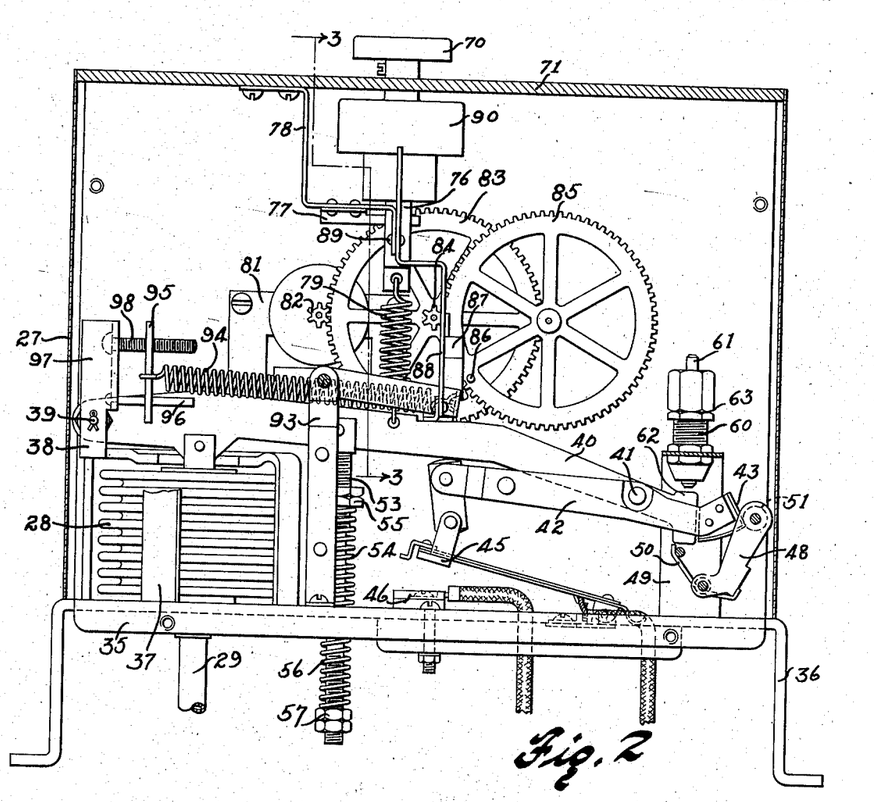
Fig. 2 is a view of the control apparatus, somewhat similar to Fig. 1, but showing the control mechanism in defrosting position.
Figure 3:
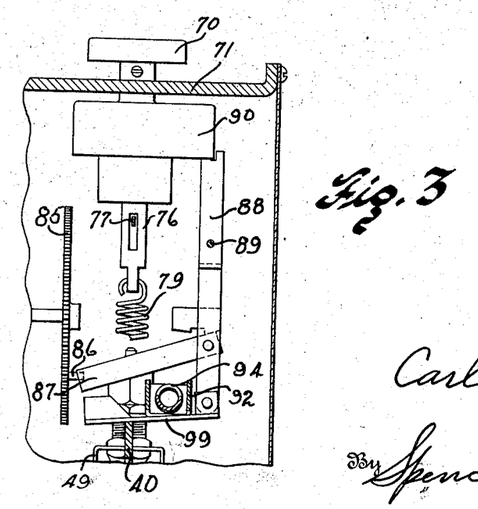
Fig. 3 is a fragmentary vertical sectional view along the lines 3—3 of Fig. 2.
Figure 4:
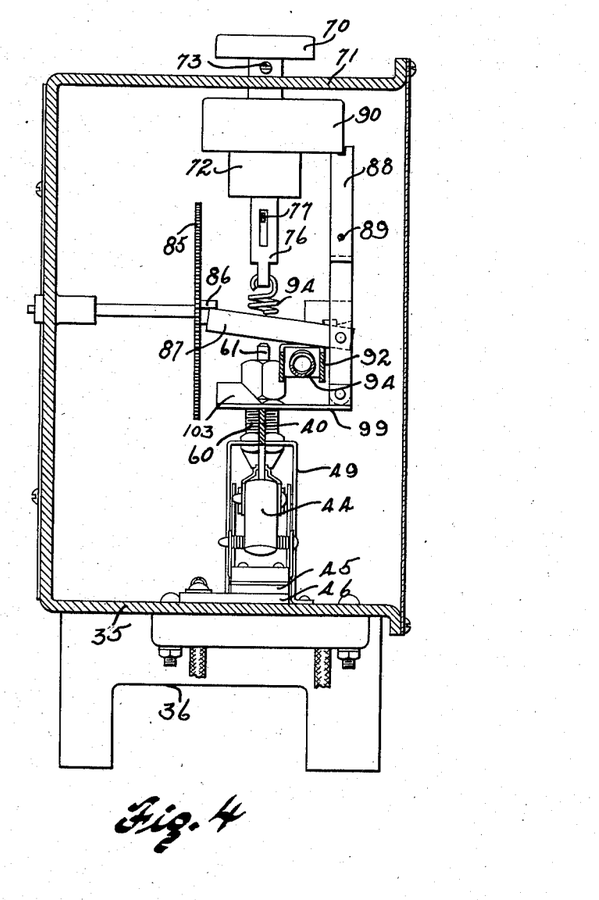
Fig. 4 is a vertical sectional view along the lines 4—4 of Fig. 1.

Referring to the drawings and more particularly to Fig. 1, there is shown a refrigerating system including a compressor 20 for compressing refrigerant and for forwarding the compressed refrigerant to a condenser 21 where the compressed refrigerant is liquefied and collected in a receiver 22. From the receiver 22, the liquefied refrigerant is forwarded through a supply conduit 23 to an evaporator 24 wherein the liquid refrigerant enters through a suitable float control valve, such as is shown in the Osborn Patent No. 1,556,708. The liquid refrigerant within the evaporating means 24 evaporates because of the absorption of heat from the food compartment within which it is located and from the ice trays, not shown, and this evaporated refrigerant is returned to the compressor through the return conduit 25. The compressor 20 is driven by the electric motor 26 through suitable pulley and belt means 27. The operation of the electric motor 26 is controlled by a control means 27' which has as its primary operating means, a metal bellows 28 which is connected by a tube 29 to the return conduit 25 so that this bellows is therefore responsive to the pressure and therefore the temperature of the evaporating means 24.

The pressure responsive bellows 28 is mounted upon a platform 35 provided with legs 36 at either end. Surrounding the bellows 28 is a sort of a cage 37 which limits the expansive movement of the bellows to prevent the distortion of the bellows under high pressure conditions. This cage 37 also has a bearing portion 38, formed as a part thereof, which supports the pivot pin 39 which in turn pivotally supports one end of the main switch lever 40. At the free or opposite end of the main switch lever 40, there is provided a second pivot pin 41 upon which is pivotally mounted a secondary lever 42 having a snap acting cam 43 at one end and having a link 44 connected thereto at the other end which connects the secondary lever to a movable switch 45 which cooperates with a stationary switch contact 46 to open and close the electric circuit 31 of the electric motor 26.

In order to open and close the switch contacts 45 and 46 with a snap action, there is provided a lever 48 pivoted at its lower end to an inverted U-shaped standard 49. A spring 50 is provided urging the lever 48 in a clockwise direction about its pivot pin. At the upper end of the lever 48 there is provided a cam roller 51 which bears against the surface of the cam 43 at the end of the secondary lever 42. The secondary lever 42 is provided with the snap acting movement by this arrangement since when this secondary lever is moved downwardly by the main lever 40, the cam roller 51 will be caused to ride over the nose of the cam 43 so that a quick movement in a clockwise direction will be impressed upon the secondary lever 42 to open the contacts 45 and 46. Likewise, when the main lever moves upwardly, the cam roller 51 will move from the upper portion of the cam 43 over its nose to the lower portion of the cam and thus will impress a quick counterclockwise movement upon the secondary lever 42 thereby quickly moving the switch contacts 45 and 46 back to closed circuit position.

In order to open the electric motor circuit 31 at the proper temperature of the evaporating means 24 and to close the circuit at the proper temperature, there is provided an adjustable spring control for the movement of the main lever 40. Connected to the main lever 40 is a threaded rod 53 which extends downwardly and passes through the platform 35. Above the platform 35 and surrounding the threaded rod 53 is a large coil spring 54 which is held in place between the platform 35 and a pair of nuts 55 threaded upon the threaded rod 53. Likewise, below the platform 35 there is provided a smaller coil spring 56 which is held between the platform and a pair of nuts 57 mounted upon the lower end of the threaded rod 53. The adjusting of the nuts 57 and 55 provides the so-called range adjustment for the switch mechanism, that is, by altering the position of these nuts, both the opening and closing temperatures will be moved substantially an equal amount in the same direction. In order to provide the so-called differential adjustment, there is provided an adjusting means 60 mounted at the top of the inverted U-shaped standard 49. This adjusting means 60 has a spring pressed plunger 61 which is limited in its downward movement but which is adapted to be engaged by the head 62 upon the free end of the main lever 40 when the main lever is in the upper portion of its path of movement. The spring tension upon the plunger 61 is adjusted by a pair of nuts 63. Inasmuch as this spring pressed plunger 61 only affects the main lever 40 in the upper portion of the path of movement, it only affects the closing temperature of the switch and therefore provides a means for adjusting the differential in temperature between the opening and closing of the switch.

In order to temporarily lower the temperature of the evaporating means for the purpose of rapidly freezing desserts and ice cubes, I provide a simplified manual temperature regulating means or control which may be operated at will by the user to obtain lower evaporating temperatures. This temperature regulating means has a knob 70 on the outside of the switch enclosure 71 which surrounds the switch mechanism.

Figure 7:
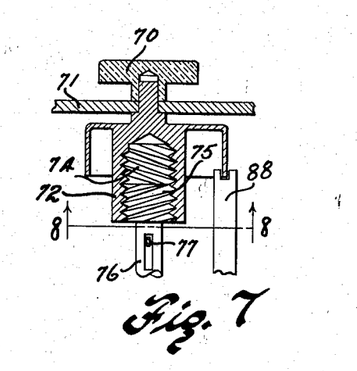
Fig. 7 is a fragmentary vertical view of a portion of the temperature regulating means.

Referring now more particularly to Fig. 7, there is shown a regulating member 72 upon the inside of the switch enclosure 71. This regulating member is connected to the knob 70 through the upper wall of the enclosure 71. The knob 70 is provided with a set screw 73 for maintaining the knob upon the regulating member 72. The regulating member 72 is provided with a cavity having a triple thread 74 therein. Threaded into this cavity 74 is a threaded member 75 which is provided with a slot 76 through which projects a member 77 to prevent its rotation. The member 77 is riveted to a bracket 78 fastened to the upper wall of the switch enclosure 71. Referring now more particularly to Fig. 1, there is shown a tension coil spring 79 having its upper end connected to the lower end of the threaded member 76 and connected at its opposite end to the main switch lever 40.

By this temperature regulating means when the knob 70 is turned in a clockwise direction, the threaded member 75 is moved upwardly, thus increasing the tension upon the temperature regulating spring 79 so as to aid the bellows 28 in moving the switch contacts 45 and 46 to closed circuit position. This will cause the evaporating means to be maintained at a lower temperature so long as the knob 70 remains in this position. When the knob 70 is returned to its original position, the refrigerating apparatus will again be restored to normal control.

As mentioned in the first portion of this application, in order to freeze ice cubes and desserts, it is necessary to operate at least a portion of the evaporating means at temperatures below freezing. This causes the accumulation of frost upon the surface of the evaporating means, and in order to maintain the efficiency of the refrigerating system it is necessary to periodically remove this frost. Heretofore this has been done merely by shutting off the refrigerating apparatus and thereby allowing the temperature of the evaporating means to rise so that the frost is melted therefrom. After the frost was melted from the evaporating means, it was then necessary to again start the refrigerating apparatus. However, the re-starting of the refrigerating apparatus was often neglected and I therefore provide means by which the evaporating means may be defrosted and at the end of the defrosting period the apparatus will be restored to normal control. I also provide means whereby this defrosting may be performed completely automatically or semi-automatically. In order to perform this defrosting completely automatically, I provide a chronometric means comprising an electric clock motor 81 which is mounted upon the rear wall of the switch enclosure 71. However, if desired the pawl and ratchet wheel means, shown in Figs. 12 to 15 inclusive, may be used in its place to perform a similar function. This electric clock motor 81 is provided with a pinion 82 which drives the gear 83 having a second pinion 84 mounted upon its shaft which in turn drives another gear 85. This gear 85 has a tripping pin 86 mounted thereon which once every revolution is adapted to engage the tripping bar 87. The opposite end of the tripping bar 87 is pivoted to a control lever 88. This control lever 88 is in turn pivoted by means of the pin 89 to the bracket 78. The upper end of the control lever 88 is forked so as to engage a cam 90 which surrounds the temperature regulating member 72 and forms a part thereof. When the temperature control knob 70 is in one position, such as that shown in Figs. 1 to 4, 7, and 8, automatic defrosting cycles are provided at timed intervals. This is accomplished by the position of the control lever 88, which holds the free end of the tripping bar 87 in the path of the pin 86 mounted upon the gear 85. The tripping bar 87 rests upon a U-shaped toggle lever 92 which is pivoted to a standard 93 mounted upon the base 35. The closed end of the U-shaped toggle lever 92 has a tension coil spring 94 connected thereto. This tension coil spring extends to an adjustable anchor plate 95 which is mounted upon the pin 96 projecting from a standard 97 extending above the bearing portion 38. An adjusting screw 98 extends from the standard 97 and is threaded into the adjusting plate 95 for moving the adjusting plate 95 so as to vary the tension upon the toggle spring 94.

When the pin 86 upon the gear 85 strikes the free end of the tripping bar 87, the tripping bar moves the free end of the toggle lever 92 downwardly past its tripping point so that the center line of the toggle spring is below the pivot of the toggle lever. This causes the toggle lever 92 to be moved from the position shown in Fig. 1 to the position shown in Fig. 2. In the position shown in Fig. 2, and more particularly in Fig. 3, the toggle lever 92 rests upon a cam bar 99 which is pivoted to the lower end of the control lever 88. This cam bar 99 rests upon the top of the main lever 40 and exerts the spring pressure provided by the toggle mechanism which includes the spring 94 and the toggle lever 92 upon the main lever so that an additional resistance is provided to the upward movement of the main lever 40. This resists the pressure within the bellows 28 so that a higher pressure and therefore a higher temperature is required within the evaporating means to overcome the resistance or spring pressure of the toggle mechanism, before the switch contacts 45 and 46 may be moved to closed circuit position. The tension of the toggle spring 94 is so adjusted that this temperature is several degrees above freezing so that the frost will melt from the cooling unit before the refrigerating system is again started. As the resistance of the toggle mechanism is overcome by the pressure within the bellows 28, the main lever 40 is moved upwardly, carrying the cam bar 99 and the toggle lever upwardly with it, and finally moves the toggle lever a sufficient amount upwardly until the center line of the toggle spring is above the center line of the pivot pins so that the toggle lever is returned to the position shown in Fig. 1. The gear 85 preferably makes several revolutions each day so that at predetermined time intervals this toggle mechanism is set so as to provide a defrosting cycle.

Referring now more particularly to Fig. 10, it will be seen that a shaft 101 is riveted to the U-shaped toggle lever and forms one of its pivots. This shaft therefore moves with the toggle lever 92.

Figure 6:
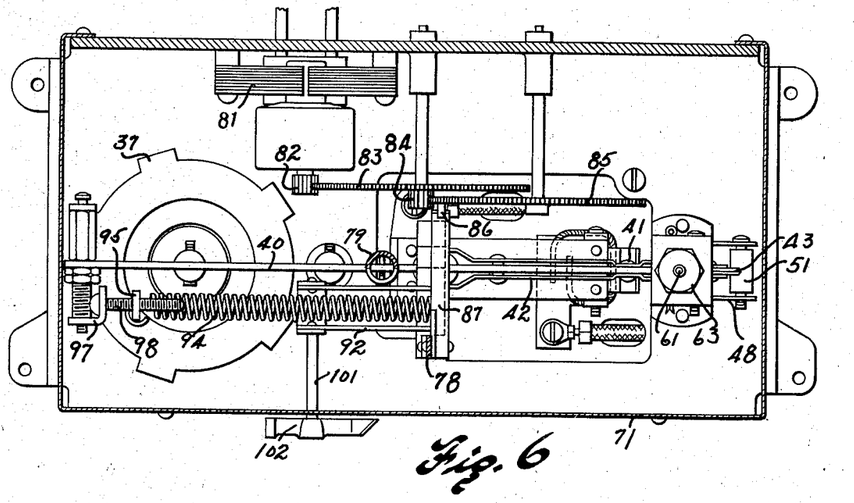
Fig. 6 is a top view of the control apparatus.
Figures 8, 9:
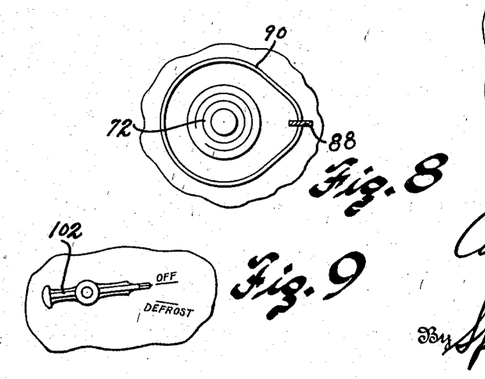
Fig. 8 is a sectional view along the line 8—8 of Fig. 7.
Fig. 9 is a fragmentary view of the indicating means and semi-automatic control means shown at the front of Fig. 6.

Referring now more particularly to Figs. 6 and 9, it will be seen that this shaft 101 extends forwardly from the switch mechanism and passes through the front portion of the switch enclosure 71. Upon the front or outer end of this rod or shaft 101 there is mounted an ornamental indicating handle 102. Cooperating with this indicating handle 102 there are provided, indices, indicating "off" and "defrosting" positions. Thus, with this mechanism each defrosting cycle will be indicated by this indicating handle during the entire time that the defrosting lever is resting upon the cam bearing 99 to provide a defrosting cycle. At the end of the defrosting cycle the indicating handle will return to "off" position along with the toggle mechanism, thus indicating that the defrosting mechanism is not in operation.

This indicating handle is also employed to provide the semi-automatic defrosting. Thus, whenever it is desired to provide a defrosting cycle of the semi-automatic type, it is merely necessary to turn the indicating handle 102 to defrost position and this will move the toggle lever 92 to its position upon the cam bar 99 for a defrosting cycle. This defrosting cycle will be terminated in the same manner as the fully automatic chronometric cycle, since the upward movement of the main lever 40 will return the toggle lever 92 to its upper or inactive position.

Figure 5:
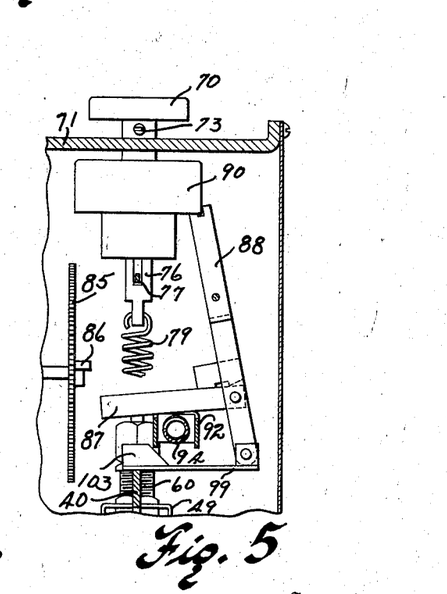
Fig. 5 is a fragmentary vertical sectional view somewhat similar to Fig. 3 but showing the control apparatus with temperature regulator adjusted to provide colder evaporator temperatures.

When it is desired to freeze desserts or ice cubes, it is often undesirable to have a defrosting cycle occur, since this will delay or even prevent the freezing of ice cubes during the defrosting period; in fact, the defrosting period usually will cause either the dessert or ice cubes to melt. In order to prevent this, the cam 90, which is formed as a part of the temperature regulating member 72, when moved to colder than normal position, will pivot the control lever 88 in a counter-clockwise direction so as to move the tripping member 87 out of the path of the tripping pin 86 upon the gear 85. In this connection, in order to interrupt any defrosting cycle, should a defrosting cycle be in operation when the temperature regulator is moved to a colder than normal position, the cam 103 is provided at the free end of the cam member 99 for moving the toggle lever 92 to its upper or inactive position. In this way when the temperature regulating mechanism is in use, freezing of ice cubes or desserts will not be interrupted by the occurrence of a defrosting cycle.

If the temperature regulating knob 70 is moved so as to move the cam 90 to an intermediate point, the cam 103 will be moved out of the path of the toggle lever 92 and yet the tripping bar 87 will still be out of the path of the tripping pin 86. In this position the semi-automatic type of defrosting cycle may be used exclusively by the use of the indicating handle 102 without any interference from the chronometric fully automatic defrosting cycle.

It will thus be seen that in this modification, I have provided a chronometric periodic defrosting means as well as a semi-automatic defrosting means, all of which are controlled and correlated with the temperature regulating mechanism so that when the temperature regulating mechanism is moved to a lower than normal position, no defrosting cycle will occur; I have also provided means by which each periodic defrosting cycle is indicated by the indicating handle 102.

In Figs. 11 to 15 inclusive, a modified form of control mechanism is shown for performing similar functions.

Figures 11, 12, 13:
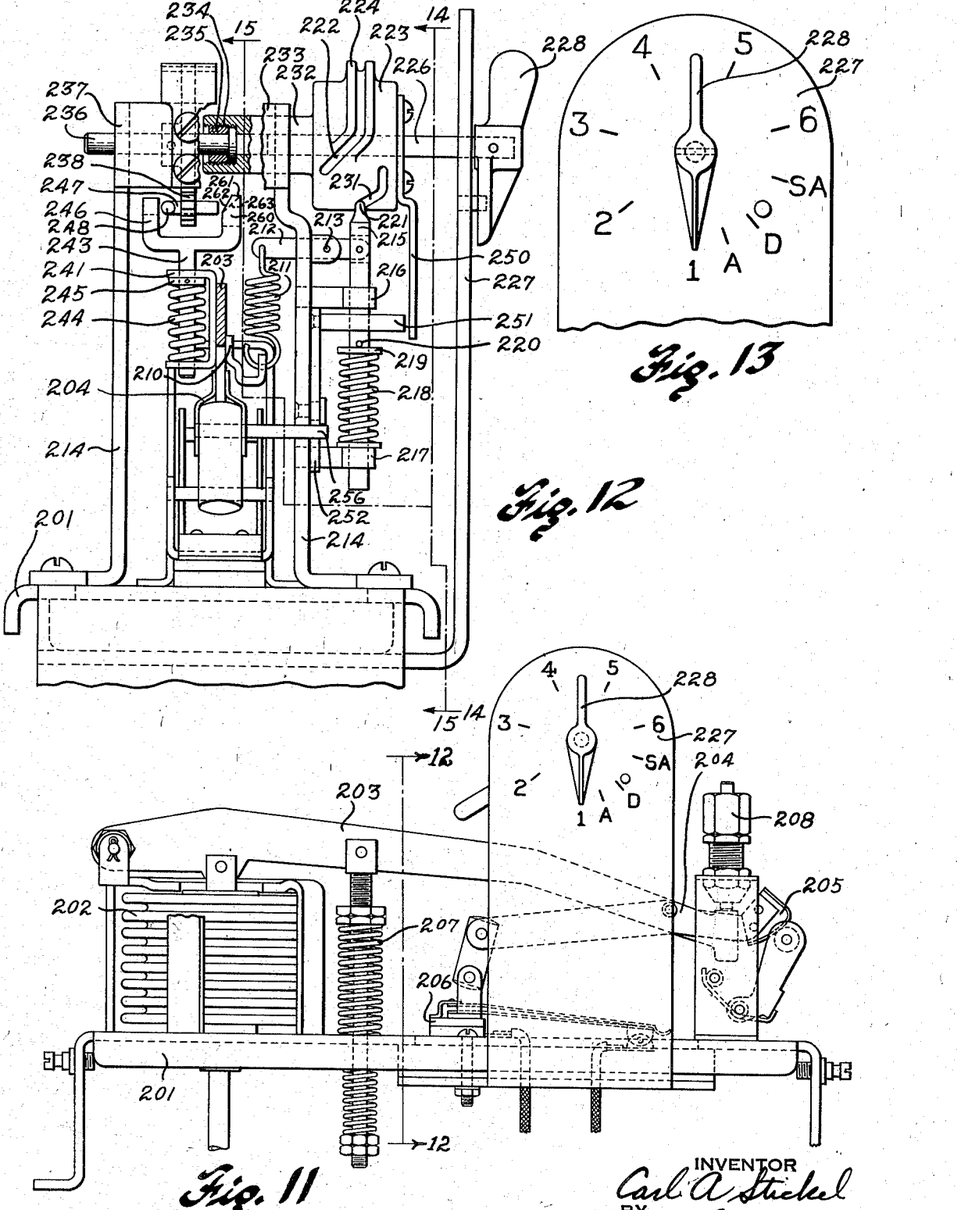
Fig. 11 is a front view of a modified form of control mechanism for the refrigerating system shown in Fig. 1.
Fig. 12 is a vertical sectional view along the lines 12—12 of Fig. 11.
Fig. 13 is a front view of the temperature regulating handle and indicating means.

Referring now more particularly to Fig. 11, there is shown a switch, somewhat similar to that shown in Fig. 1, having a platform 201 with a bellows 202 mounted thereon which is connected to a main lever 203 which in turn is connected to a secondary lever 204 provided with a snap acting cam roller mechanism 205 at one end and a set of switch contacts 206 at the other end. The main lever is also provided with a range adjusting means 207 and a differential adjusting means 208. The bellows 202 is connected to the return conduit 25 similarly to Fig. 1.

Referring now more particularly to Fig. 12, the main lever 203 is shown in cross section in approximately the center of the figure. This main lever 203 has a bracket 210 welded thereto to which is fastened the lower end of a tension coil type of temperature regulating spring 211. The upper end of this temperature regulating spring 211 is connected to one end of a horizontal lever 212 which is pivoted at 213 to a vertical standard 214 mounted on the base 201. The other end of the horizontal lever 212 is connected by means of a slotted connection to a cam follower 215 which is adapted to move vertically within a pair of guides 216 and 217. At the lower end of this cam follower 215 there is a compression coil spring 218 which has its lower end resting against the guide 217 and its upper end resting against a washer 219 which in turn rests against a pin 220 passing through the cam follower 215. This spring therefore urges the cam follower 215 in an upward direction. The upper end of the cam follower 215 is provided with a rounded nose 221 which extends into a cylindrical cam groove 222 of the cylindrical cam 223. The cylindrical cam 223 is both slidable and rotatable. The central portion of the cam slot or groove 222 extends more than three-quarters of a revolution around the cam 223 without deviating in an axial direction. As shown more clearly in Fig. 14, this portion of the cam is provided with a raised temperature regulating portion 224 which gradually increases in height and then returns rather sharply as shown at 225 to its former position with respect to the cylindrical surface of the cam 223. The cylindrical cam 223 is slidably mounted upon a squared shaft 226 which permits the cam 223 to be moved axially with respect to the shaft but requires the cam to move with the shaft when the shaft is turned.

The front end of the shaft passes through a plate 227 which is supported from the base 201. The outer end of the shaft 226 is provided with a temperature regulating indicating handle 228. The plate 227 is provided with indices cooperating with the indicating handle 228 to indicate the various temperature regulating positions, namely 1, 2, 3, 4, 5, and 6. As shown in the figures, the indicating handle 228 and the entire mechanism is set for number one temperature regulating position. When the indicating handle 228 is moved to the position 2, the cam 223 is moved in a clockwise direction so as to present the first portion of the raised temperature regulating portion of the control cam 223. As mentioned before, this portion of the cam groove 223 extends gradually upwardly in a radial direction similarly to the form of a spiral. This portion of the cam groove 222 therefore causes the cam follower 215 to be gradually moved downwardly. The degree of this movement depends upon the degree or amount which the indicating handle is moved clockwise from the number one position. Thus, the further the indicating handle 228 is moved from number one position, the greater distance the cam follower 215 will be moved downwardly and thus the greater distance the horizontal lever 212 will be moved in a clockwise direction to increase the tension of the temperature regulating spring so as to provide an upward pull upon the main lever and thereby lower the temperature of the evaporation means.

Upon the indicating plate 227, I have also provided positions indicated by "A", which indicates full automatic defrosting; by "D", which indicates fully manual defrosting; and by "SA" which indicates semi-automatic defrosting. When the indicating handle is moved to the position indicated by "A" for full automatic defrosting, the nose 221 at the upper end of the cam follower enters the portion of the cam groove 222 indicated by the reference character 231. This portion of the cam groove 222 is inclined to the axis of the cam 223 at an angle of approximately 45°. When the cam 223 is moved so that the cam follower 215 enters this angular portion 231 of the groove 222, the cam 223 is moved axially to the left. The cam 223 has a bearing portion 232 which extends to the left therefrom and enters the bearing 233 mounted in the upper portion of the standard 214. The bearing portion 232 is provided with a threaded recess 234 containing a threaded plug 235 which holds the flanged end of a shaft 236 which moves axially with the cylindrical cam 223, but rotates independently thereof. The other end of this shaft 236 is supported in a bearing 237 in another portion of the standard 214.

Figures 14, 15:
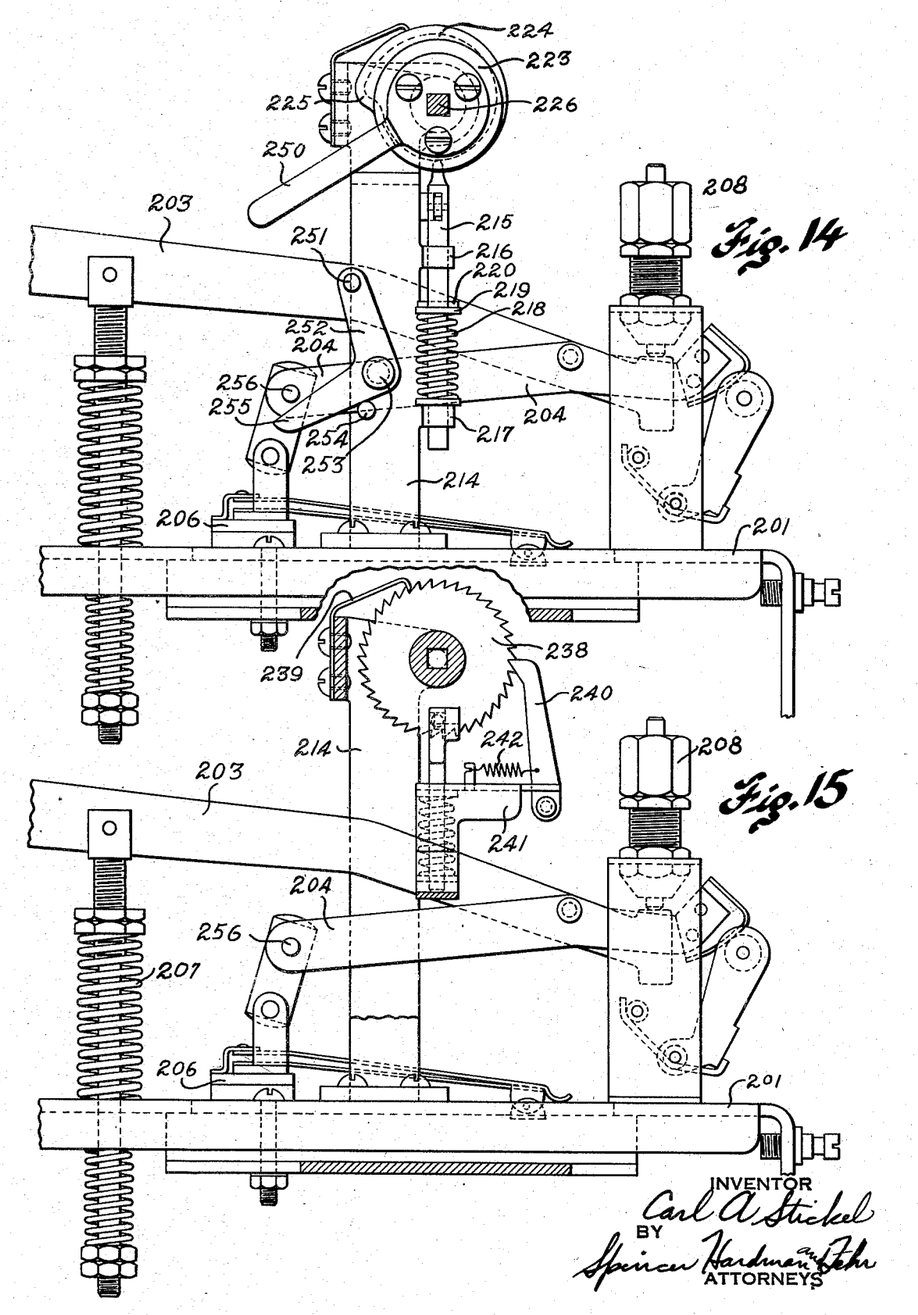
Fig. 14 is a sectional view along the lines 14—14 of Fig. 12.
Fig. 15 is a sectional view along the line 15—15 of Fig. 12.
Figure 16:
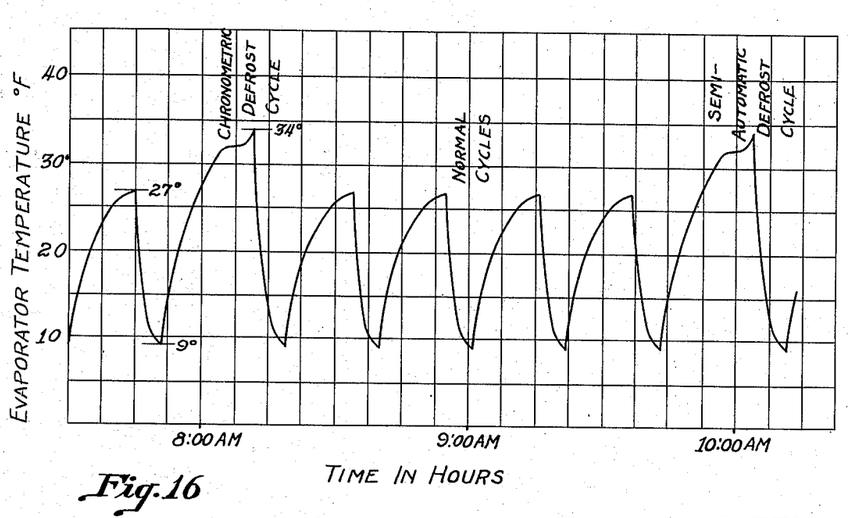
Fig. 16 is an evaporator temperature-time graph of a refrigerating system provided with a control such as is shown in Figs. 1 to 10 inclusive showing normal cycles, a chronometric defrost cycle and a semi-automatic defrost cycle.
Figure 17:
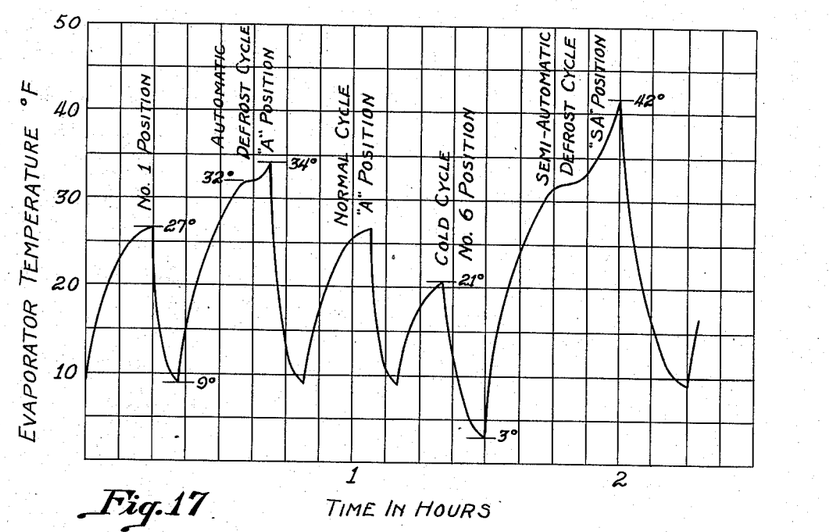
Fig. 17 is an evaporator temperature-time graph of a refrigerating system provided with a control such as is shown in Figs. 11 to 15 inclusive showing cycling in various positions of the indicating handle 228.

Referring now more particularly to Fig. 15, it will be seen that there is a ratchet wheel 238 which is pinned to the shaft 237. This ratchet wheel 238 is provided with a spring aligning pawl 239 which is fastened to a portion of the standard 214. The ratchet wheel 238 is indexed a tooth at a time by an indexing pawl 240 which is pivoted to a bracket 241 mounted upon the left side of the main lever 203 as viewed in Fig. 12. The pawl 240 is spring pressed against the ratchet wheel 238 by a spring 242 which is connected to an anchor pin mounted in the bracket 241. As shown more clearly in Fig. 12, the bracket 241 has a U-shaped portion which receives the lower end of a forked or Y-shaped member 243. This lower end of the member 243 passes through both the upper and lower flanges of the bracket 241. Between these upper and lower flanges there is provided a compression type coil spring 244 which has its lower end pressing against the lower flange of the bracket 241 while its upper end presses against the collar 245 which is pinned to the lower portion of the member 243 and which is held against the upper flange of the bracket 241 by the tension of the spring 244. The Y-shaped member 243 has two prongs at its upper end. One of these prongs 246 has its side beveled. This prong 246 is adapted to cooperate with a pin 247 which projects from the ratchet wheel 238. This pin 247 is provided with a beveled face 248.

When the cam 223 is slid to the left upon the squared shaft 226, the ratchet wheel 238 is also moved to the left so that the path of movement of the left end of the pin 247 is in alignment with the upper portion of the prong 246. The side of the prong 246 and the end 248 of the pin 247 are beveled so as to prevent any misengagement between the pin 247 and the prong 246 should these be in axial alignment when the cam 223 is shifted. Thus, the cooperating beveled surface of the prong and the pin will move the ratchet wheel and travel in a counterclockwise direction so as to permit the ratchet wheel 238 to be moved to the left to full automatic position. The movement of the switch lever 203 will cause the prong 246 to be moved up and down with each cycle. The ratchet wheel will also be turned each cycle and when the pin 247 comes to the bottom position, the top of the prong 246 will engage the under side of the pin 247. This will require that the bellows overcome the tension of the compression spring 244 in addition to the other control springs before the main switch lever can again be moved to closed circuit position. This will, of course, result in a defrosting cycle and will increase the temperature of the evaporating means so that the frost will melt therefrom. When the temperature and pressure within the evaporating means has become sufficiently high to melt the frost therefrom and to overcome the tension of the compression spring 244 and the other control springs, the refrigerating apparatus will start and the switch lever 203 will be moved to its lower position. Upon the next upward movement the ratchet wheel 238 will be turned by the pawl 240 so as to move the pin 247 away from the prong 246. In this way so long as the indicating handle is in the position marked "A" for fully automatic defrosting, periodic defrosting cycles will be provided.

By rotating the indicating handle 228 to the position marked "D", a fully manual type of defrosting is obtained. In making this movement, the cam 223 is moved further in a counterclockwise direction so that it approaches one end of this cam groove. In this position the cam 223 has been moved to its extreme left position, thus throwing the manual defrosting arm 250 into alignment with a pin 251 projecting from the bell crank lever 252 which is pivoted by means of the pin 253 to the standard 214. When the indicating handle 228 is moved to the manual defrosting position marked "D", the arm 250 which is fastened to the right end of the cam 223 engages the pin 251 to rotate the bell crank lever 253 in a clockwise direction away from its stop pin 254. This causes the arm 255 of the bell crank lever 252 to engage the link pin 256 which extends from the secondary lever 204 in order to forcibly rotate the secondary lever 204 in a clockwise direction to open circuit position. This will cause the switch contact 206 to be maintained in open circuit position so long as the indicating handle 228 is maintained in the "D" position; that is, the refrigerating apparatus is shut off as long as the indicating handle is in this position.

I have also provided means for semi-automatic defrosting. This is done by turning the indicating handle almost a complete turn in a clockwise direction to the position marked "SA", or semi-automatic position. In this turning of the indicating handle 228, the cam follower 215 moves through the entire length of the cam groove 222 and enters the opposite end of the cam groove 222 which is also inclined to the axis of the cam at an angle of about 45°. This causes the cam 223 to be moved to its extreme right position. This moves the ratchet wheel 238 to its extreme right position so that the right end of the pin 247 will have its path of movement in alignment with the semi-automatic prong 260 which is opposite the fully automatic prong 246 and which is higher and provided with a portion of its upper surface beveled. This prong has a flat portion 261 in its forward portion which is flanked by a beveled portion 262. Should this prong 260 and the pin 247 be in axial alignment, the end of the pin will ride over the beveled surface 262 on to the flat top surface 261 thereby compressing the spring 244 to provide a defrosting cycle. If the prong 260 and the pin 247 are not in axial alignment when the shift is made, the pin 247 will engage the prong 260 when the ratchet wheel has been moved step by step sufficiently to place the pin 247 in vertical alignment with the top of the prong 260. At the rear of the flat top portion 261 there is provided a second beveled portion 263. This second beveled portion is for the purpose of returning the ratchet wheel to neutral position, that is, its mid position, such as that shown in Fig. 12 so as to terminate the semi-automatic defrosting cycle. Thus, after the pin 247 is engaged by the flat top 261, the ratchet wheel and the pin 247 will be moved in a clockwise direction so that upon the next upward movement of the main lever 203, the beveled portion 263 of the prong 260 will engage the right end of the pin 247 and move the ratchet wheel 238 to its neutral position. This will also move the cam 223 axially and the nose 221 of the cam follower will cause the squared shaft 226 to be turned a small amount so as to move the indicating handle 228 away from the position designated as "SA".

It should be noted that this semi-automatic prong 260 is higher than the full automatic prong 246 so that it puts a greater tension upon the spring 244 and therefore requires a higher temperature than the evaporating means before the switch contacts may be moved to closed circuit position. The prong is constructed in this way for the reason that when semi-automatic defrosting is used it is often done at less frequent intervals so that a greater accumulation of frost is often allowed to accumulate. In order to reduce this frost rapidly, it is desirable to allow the evaporator to come to a slightly higher temperature before normal operation of the system is resumed.

Thus, in this modification I have provided a temperature regulating means, a fully automatic defrosting means, a semi-automatic defrosting means, and a fully manual defrosting means, all controlled by the indicating handle 228 and all coordinated under the control of a single control cam 223 which is effective both axially and radially.

While the form of embodiment of the invention as herein disclosed, constitutes a preferred form, it is to be understood that other forms might be adopted, all coming within the scope of the claims which follow.

What is claimed is as follows:

1. Refrigerating apparatus including a refrigerant liquefying means and a refrigerant evaporating means, means for normally controlling the apparatus for maintaining said evaporating means at predetermined temperatures, chronometric means for periodically acting upon the control means to modify the action of the control means for varying the temperature of the evaporating means, means operable at will for temporarily varying the temperature of the evaporating means, and mechanical means rendered effective by said means operable at will for rendering the chronometric means ineffective to vary the temperature of the evaporating means.

2. Refrigerating apparatus including a refrigerant liquefying means and a refrigerant evaporating means, means for normally controlling the apparatus for normally maintaining said evaporating means at a predetermined average temperature, chronometric means for periodically acting upon the control means for periodically varying the temperature of the evaporating means, means operable at will for temporarily varying the temperature of the evaporating means, and means rendered effective by said means operable at will for breaking the operative connection between the chronometric means and the control means.

3. Refrigerating apparatus including a refrigerant liquefying means and a refrigerant evaporating means, means for normally controlling the apparatus for maintaining said evaporating means at water freezing temperatures, means for periodically acting upon the control means for periodically raising the temperature of the evaporating means above water freezing temperatures, means operable at will for temporarily lowering the temperature of the evaporating means, and means rendered effective by said means operable at will for breaking the operative connection between the periodic means and the control means.

4. Refrigerating apparatus including a refrigerant liquefying means and a refrigerant evaporating means, control means for said apparatus for maintaining said evaporating means at predetermined temperatures, a toggle mechanism acting upon the control means for providing temporarily a different temperature of the evaporating means, means for periodically setting said toggle mechanism to obtain periodically different temperatures of the evaporating means, means for temporarily varying the temperature of the evaporating means, and means controlled by said means for temporarily varying the temperature for preventing the tripping of the toggle mechanism by the periodic means.

5. Refrigerating apparatus including a refrigerant liquefying means and a refrigerant evaporating means, control means for said apparatus for maintaining said evaporating means at predetermined temperatures, a toggle mechanism acting upon the control means for providing temporarily a different temperature of the evaporating means, means for periodically setting said toggle mechanism to obtain periodically different temperatures of the evaporating means, and manual means for controlling said toggle mechanism.

6. Refrigerating apparatus including a refrigerant liquefying means and a refrigerant evaporating means, means for controlling the apparatus for normally maintaining the evaporating means at a desired average temperature, means for periodically increasing the temperature of the evaporating means above water freezing temperatures for providing periodic defrosting cycles, means operable at will for providing a single defrosting cycle and thereafter returning the apparatus to normal operation, and means operable at will for temporarily lowering the average temperature of the evaporating means.

7. Refrigerating apparatus including a refrigerant liquefying means and a refrigerant evaporating means, means for controlling the apparatus for normally maintaining the evaporating means at a predetermined average temperature, means for periodically varying the temperature of the evaporating means for providing periodic varied cycles, means operable at will for providing a single varied cycle and thereafter returning the apparatus to normal operation, a second means operable at will for temporarily varying the average temperature of the evaporating means, and means controlled by said second means when effective for preventing the occurrence of said periodic cycles.

8. Refrigerating apparatus including a refrigerant liquefying means and a refrigerant evaporating means, means for controlling the apparatus for normally maintaining the evaporating means at a predetermined average temperature, means for periodically varying the temperature of the evaporating means for providing periodic varied cycles, means operable at will for providing a single varied cycle and thereafter returning the apparatus to normal operation, a second means operable at will for temporarily varying the average temperature of the evaporating means, and cam means controlled by said second means for rendering ineffective said periodic means and the first mentioned means operable at will.

9. Refrigerating apparatus including refrigerant liquefying means and refrigerant evaporating means, control means for said apparatus for normally maintaining said evaporating means at a predetermined average temperature, a device movable to and from an effective and an ineffective position for acting upon the control means to modify the operation thereof for varying the average temperature of the evaporating means, said device being moved to an ineffective position from an effective position by the action of the control means upon the attainment of a predetermined temperature in the evaporating means, and means for periodically moving said device from an ineffective position to an effective position and then disengaging itself from the device for periodically setting the device to vary the evaporator temperatures.

10. Refrigerating apparatus including refrigerant liquefying means and refrigerant evaporating means, control means for said apparatus for normally maintaining said evaporating means at a predetermined average temperature, means for periodically interposing a yielding resistance to the action of the control means for periodically varying the temperature of the evaporating means, means operable at will for interposing a stiffer yielding resistance to the action of the control means for varying at will the temperature of the evaporating means, said stiffer yielding resistance providing a greater variation of evaporator temperature than said first mentioned yielding resistance.

11. Refrigerating apparatus including a refrigerant liquefying means and a refrigerant evaporating means, control means for said apparatus for maintaining said evaporating means at predetermined temperatures, a toggle over center mechanism acting upon the control means for providing temporarily a different temperature of the evaporating means, means for periodically throwing said toggle mechanism across its dead center position into action upon the control means to obtain periodically different temperatures of the evaporating means, and means operable at will for tripping said toggle mechanism.

12. Refrigerating apparatus including a refrigerant liquefying means and a refrigerant evaporating means, a movable control means for controlling the starting and stopping of the refrigerant liquefying means to maintain the evaporating means at a predetermined normal average temperature, said movable means thus providing operating and idle periods of the liquefying means, a yielding resistance and chronometrically controlled means for periodically interposing said yielding resistance to oppose the movement of said movable control means to starting position so as to prolong certain idle periods of the liquefying means.

CARL A. STICKEL.